United States Patent
Gwidt et al.

(10) Patent No.: US 7,478,625 B1
(45) Date of Patent: Jan. 20, 2009

(54) ENGINE CRANKING SYSTEM WITH CYLINDER DEACTIVATION FOR A DIRECT INJECTION ENGINE

(75) Inventors: Jesse M. Gwidt, Brighton, MI (US);
Jonathan T. Shibata, Milan, MI (US);
Vijay Ramappan, Novi, MI (US);
Stuart R. Smith, Howell, MI (US);
Michael J. Lucido, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/853,148

(22) Filed: Sep. 11, 2007

(51) Int. Cl.
*F02D 7/00* (2006.01)
*F02D 7/02* (2006.01)

(52) U.S. Cl. ............... 123/481; 123/179.16; 123/179.17

(58) Field of Classification Search .............. 123/491, 123/179.1, 179.3, 179.5, 179.13, 179.16, 123/179.17, 456, 481, 482, 486, 198 F
See application file for complete search history.

(56) References Cited

U.S. PATENT DOCUMENTS

| | | | |
|---|---|---|---|
| 6,609,492 B2 | 8/2003 | Naik | |
| 6,651,611 B2 | 11/2003 | Lippert et al. | |
| 6,659,074 B2 | 12/2003 | Lippert et al. | |
| 6,763,807 B1* | 7/2004 | Gilles et al. | 123/435 |
| 7,021,046 B2* | 4/2006 | Surnilla et al. | 60/285 |
| 2005/0193980 A1* | 9/2005 | Doering | 123/406.47 |
| 2005/0193988 A1* | 9/2005 | Bidner et al. | 123/481 |
| 2006/0196178 A1* | 9/2006 | Caine et al. | 60/324 |
| 2007/0186909 A1* | 8/2007 | Ukai et al. | 123/497 |
| 2008/0072862 A1* | 3/2008 | Turner et al. | 123/184.42 |

* cited by examiner

*Primary Examiner*—Mahmoud Gimie

(57) ABSTRACT

An engine cranking system includes fuel injectors that are associated with multiple combustion chambers of an engine. The fuel injectors include a first fuel injector that is associated with a first combustion chamber. A second fuel injector is associated with a second combustion chamber. A control module is coupled to the fuel injectors and operates the first fuel injector in a deactivated state for a first chamber cycle during cranking of said engine. The first chamber cycle includes intake and exhaust strokes and is associated with a first combustion chamber.

21 Claims, 3 Drawing Sheets

ENGINE CRANKING SYSTEM WITH CYLINDER DEACTIVATION FOR A DIRECT INJECTION ENGINE

FIELD

The present disclosure relates to operation of direct injection engines and more particularly to start up and cranking of direct injection engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Spark ignition direct injection (SIDI) systems for internal combustion engines have been proposed to improve fuel economy. A SIDI system includes a high-pressure fuel injection system that directly injects fuel into combustion chambers of an engine. This creates a stratified charge in the combustion chambers that result in fuel economy benefits. The benefits are provided due to less restrictive throttling requirements and improved fuel combustion characteristics.

The high-pressure fuel injection system includes a high-pressure pump that is mechanically driven based on a rotation speed of the engine. The high-pressure pump provides fuel to fuel injectors of the engine via a high-pressure fuel rail. When an engine is at rest for an extended period, referred to as a prolonged soak, fuel rail pressure in the high-pressure fuel rail decays to approximately 0 Kg/cm. During engine cranking, when the engine is cold, the fuel rail pressure needs to reach a high-pressure in a short period of time in order to initiate a sustained and efficient combustion. The fuel rail pressure needs to reach a pressure that is higher than can normally be provided from a fuel tank by a fuel injection system.

The required fuel rail pressure is dependent on injector flow parameters, engine cranking speeds and an allowable fuel injection timing window. Engine cranking speeds are a function of battery conditions and engine temperatures. During cold operating conditions, low crank speeds and high crank fuel pulse widths are experienced. A typical engine cranking speed is approximately 100 revolutions per minute (RPM) at cold operating temperatures. Due to the low cranking speed, the high-pressure pump is unable to provide demanded fuel flow-pressure during start up.

Also, during injection of fuel into a combustion chamber, the fuel rail pressure needs to be greater than pressure within the combustion chamber. This allows for a net flow of fuel out of a fuel injector and into the combustion chamber.

SUMMARY

Accordingly, an engine cranking system includes fuel injectors that are associated with multiple combustion chambers of an engine. The fuel injectors include a first fuel injector that is associated with a first combustion chamber. A second fuel injector is associated with a second combustion chamber. A control module is coupled to the fuel injectors and operates the first fuel injector in a deactivated state for a first chamber cycle during cranking of said engine. The first chamber cycle includes intake and exhaust strokes and is associated with a first combustion chamber.

In other features, an engine system includes an engine that has a combustion chamber with a chamber cycle. A fuel injector is associated with the combustion chamber. A temperature sensor generates a temperature signal. A control module operates the fuel injector in a deactivated state for the chamber cycle during cranking of the engine and based on the temperature signal. The chamber cycle includes intake and exhaust strokes.

In yet other features, a method of starting an engine includes cranking an engine. The cranking of the engine includes rotating the engine through multiple chamber cycles. A fuel injector associated with a combustion chamber of the engine is deactivated for at least one of the chamber cycles.

Further areas of applicability will become apparent from the description provided herein. It should be understood that the description and specific examples are intended for purposes of illustration only and are not intended to limit the scope of the present disclosure.

DRAWINGS

The present disclosure will become more fully understood from the detailed description and the accompanying drawings, wherein.

DETAILED DESCRIPTION

Figure 1:
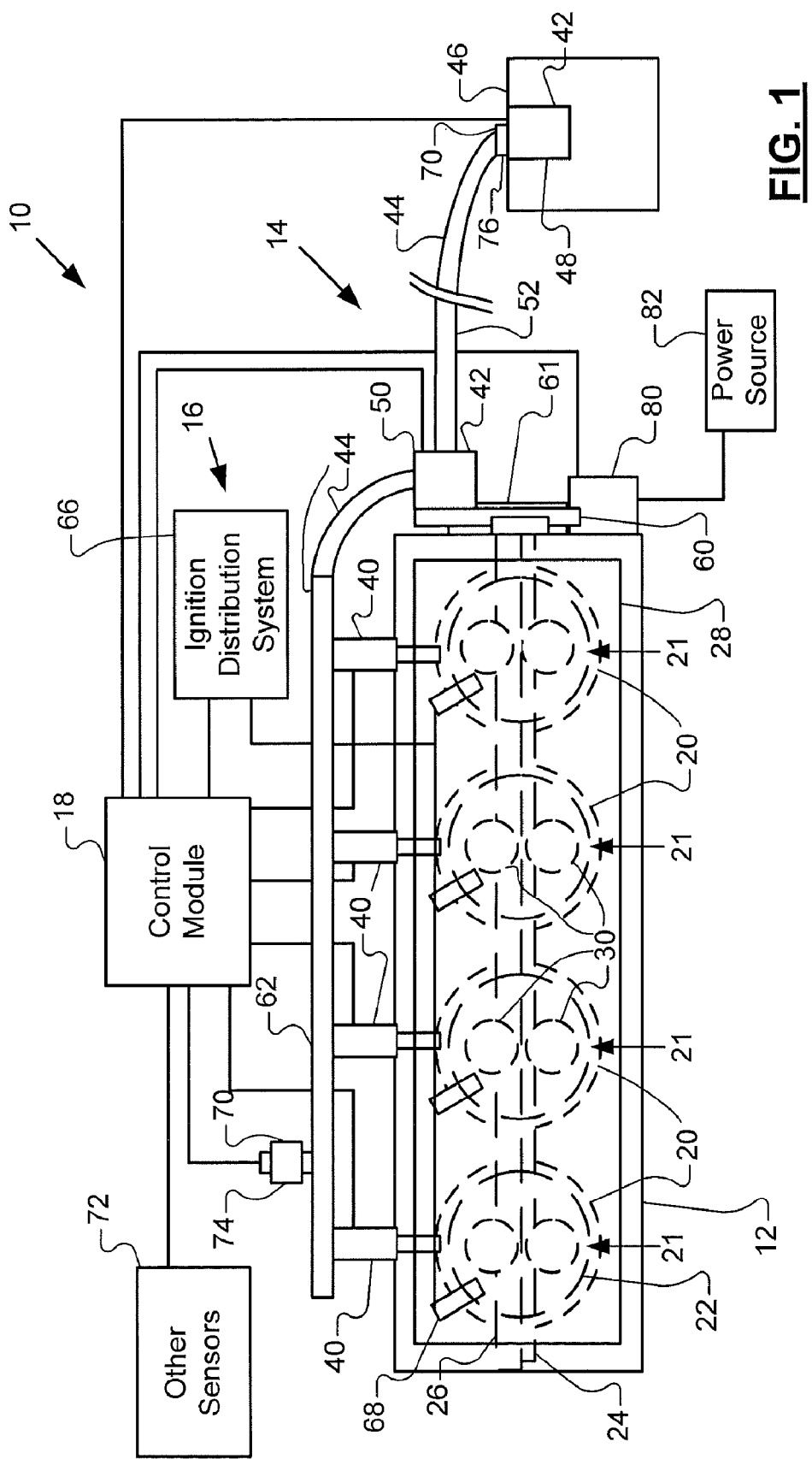
FIG. 1 is a functional block diagram of an exemplary engine cranking system in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Also, in the following description the term cranking refers to turning over an engine to start a reciprocating motion of one or more components thereof. For example, a starter may crank or turn a crankshaft of an engine to initiate a reciprocating motion of pistons therein and facilitate a combustion cycle.

Additionally, in the following description the term combustion cycle refers to a multiple stroke cycle, which may include an intake stroke, a compression stroke, an ignition stroke, and an exhaust stroke. Note that a combustion cycle may, for example include two strokes or four strokes, or some other combination of strokes.

Furthermore, in the following description the term chamber cycle also refers to a multiple stroke cycle. However, a chamber cycle may be a combustion cycle or a non-combustion cycle. In other words, a chamber cycle may include multiple stokes that are normally associated with intake, compression, ignition and exhaust strokes of a combustion chamber and yet not receive intake air and fuel, receive a spark from an ignition system, and may not release an exhaust gas. During a non-combustion or deactive chamber cycle, fuel injection, valve opening, and spark ignition may be deactivated.

Referring to FIG. 1, a functional block diagram of an exemplary engine cranking system 10 is shown. It is appreciated that the engine cranking system 10 is merely exemplary. The engine cranking system 10 may include gasoline direct injection engine systems, homogeneous charge compression ignition engine systems, diesel engine systems and/or other engine systems.

The engine cranking system 10 includes an internal combustion engine 12, a common rail fuel injection system 14, an ignition system 16, and a control module 18. In operation, the engine 12 combusts an air and fuel mixture to produce drive torque. The engine 12 includes four cylinders 20 configured in a cylinder bank with an I-type layout. The cylinders 20 have associated combustion chambers 21, which may include portions of pistons 22 therein. Although FIG. 1 depicts four cylinders (N=4), it can be appreciated that the engine 12 may include additional or fewer cylinders. For example, engines having 2, 3, 4, 5, 6, 8, 10, 12 and 16 cylinders are contemplated.

Air may be drawn into an intake manifold through a throttle. Air is drawn into the cylinders 20 from the intake manifold and is compressed therein. Fuel is injected into cylinders 20 by the fuel injection system 14 and heat of the compressed air ignites the air/fuel mixture. Exhaust gases are exhausted from the cylinders 22 into an exhaust system.

The engine 12 also may include a crankshaft 24, one or more camshafts 26, and a valve train 28. When rotated, the crankshaft 24 actuates the pistons 22 through a reciprocating motion within the cylinders 20. The camshafts 26, when incorporated, are used to open and close valves 30 of the valve train 28 to allow intake air to enter and exhaust gas to be released from the combustion chambers 21.

The fuel injection system 14 includes fuel injectors 40 that are mounted on the engine 12 and that directly inject fuel into combustion chambers 21. The fuel injectors 40 receive fuel from one or more fuel pumps 42, one or more fuel rails or lines 44, and a fuel tank 46. In the example embodiment shown, a low-pressure fuel pump 48 is disposed within the fuel tank 46 and provides fuel to a high-pressure pump 50 via a low-pressure fuel line 52. The high-pressure pump 50 is mounted on or proximate to the engine 12 and operates based on speed of the engine. The high-pressure pump 50 may receive rotational energy from the crankshaft 24 via a belt 60 and a pair of pulleys 61 or the like. The pulleys 61 provide a predetermined ratio between the operating speed of the engine 12 and the operating speed of the high-pressure pump 50. The high-pressure pump may operate based on speed of a camshaft or via some other control mechanism. A high-pressure fuel rail 62 channels fuel between the high-pressure pump 50 and the fuel injectors 40. The fuel injectors 40 provide fuel to the combustion chambers 21 based on signals received from the control module 18.

The ignition system 16 provides a spark to ignite air/fuel mixtures in each of the combustion chambers 21. The ignition system 16 may include an ignition distribution system 66 that provides current to one or more spark plugs 68 or other ignition devices. The ignition distribution system 66 may include coils, distributors, wires, and other mechanical and/or electronic ignition components and devices.

The control module 18 regulates operation of the system 10 according to engine start up and cranking methods of the present disclosure. The control module 18 may receive sensor status signals from various sensors, such as fuel pressure sensors 70 and other sensors 72. Based on status signals received from the sensors 70 and 72, the control module 18 controls air injection, fuel injection, cranking, ignition and other engine operating functions. The fuel pressure sensors 70 may include a high-pressure sensor 74 and/or a low-pressure sensor 76. The high-pressure sensor 74 detects pressure in the high-pressure fuel rail 62. The low-pressure sensor 76 may detect fuel pressure in the low-pressure line 52.

The other sensors 72 may include, for example, temperature sensors, pressure sensors, flow sensors, oxygen level sensors, engine speed sensors, and air-fuel sensors for status determination and control of the engine cranking system 10. The temperature sensors may include an engine temperature sensor, a coolant temperature sensor, an oil temperature sensor, an ambient temperature sensor and/or other temperature sensors. The pressure sensors may include cylinder pressure sensors.

The control module 18 may be microprocessor based such as a computer having a central processing unit, memory (RAM and/or ROM), and associated input and output buses. The control module 18 may be an application-specific integrated circuit or may be formed of other logic devices known in the art. The control module 18 may each be a portion of a central vehicle main control unit, an interactive vehicle dynamics module, a main control module, a control circuit having a power supply, combined into a single integrated control module, or may be a stand-alone control module as shown.

The engine cranking system 10 may further include a starter 80. The starter 80 is used to crank the crankshaft 24 directly and indirectly and begin the reciprocating motion of the pistons 22 to facilitate the internal combustion process. The starter 80 may receive power from a power source 82, such as a battery, or some other power source 82. The starter 80 may rotate a flywheel that is coupled to the camshaft 24.

Figure 2:
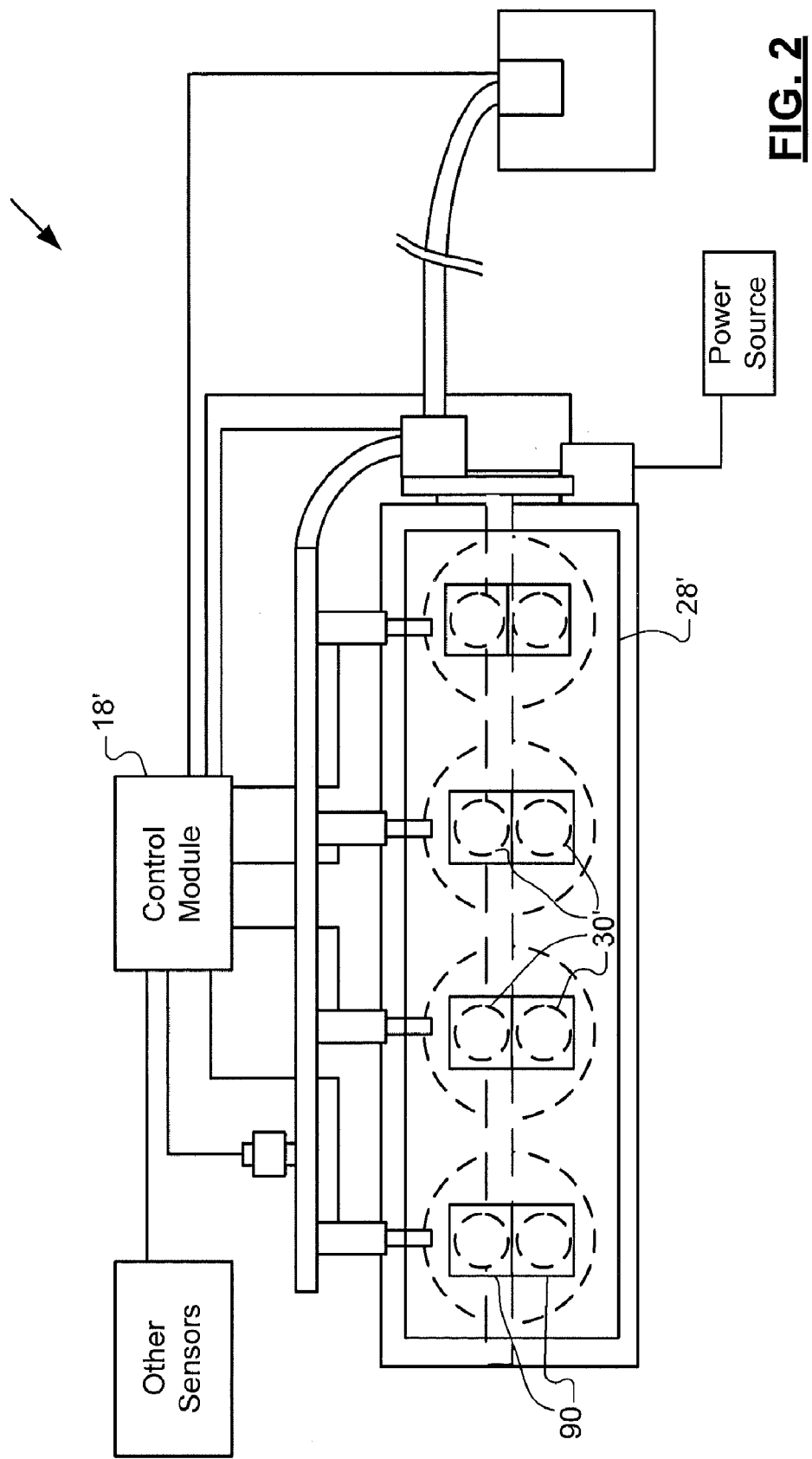
FIG. 2 is a functional block diagram of an exemplary engine cranking system in accordance with another embodiment of the present disclosure.

Referring to FIG. 2, a functional block diagram of another exemplary engine cranking system 10' is shown. The engine cranking system 10' includes a valve train 28' with independently operated intake and exhaust valves 30'. Intake and exhaust solenoids 90 are used for operation of the intake and exhaust valves 30'. The intake and exhaust valves 30' are not actuated via one or more camshafts. The solenoids 90 may be electronically operated by a control module 18'. The engine cranking system 10' is provided as one example to illustrate a system with independently operated valves, the present invention may apply to engine systems that employ other independent valve operation and control systems and techniques.

Figure 3:
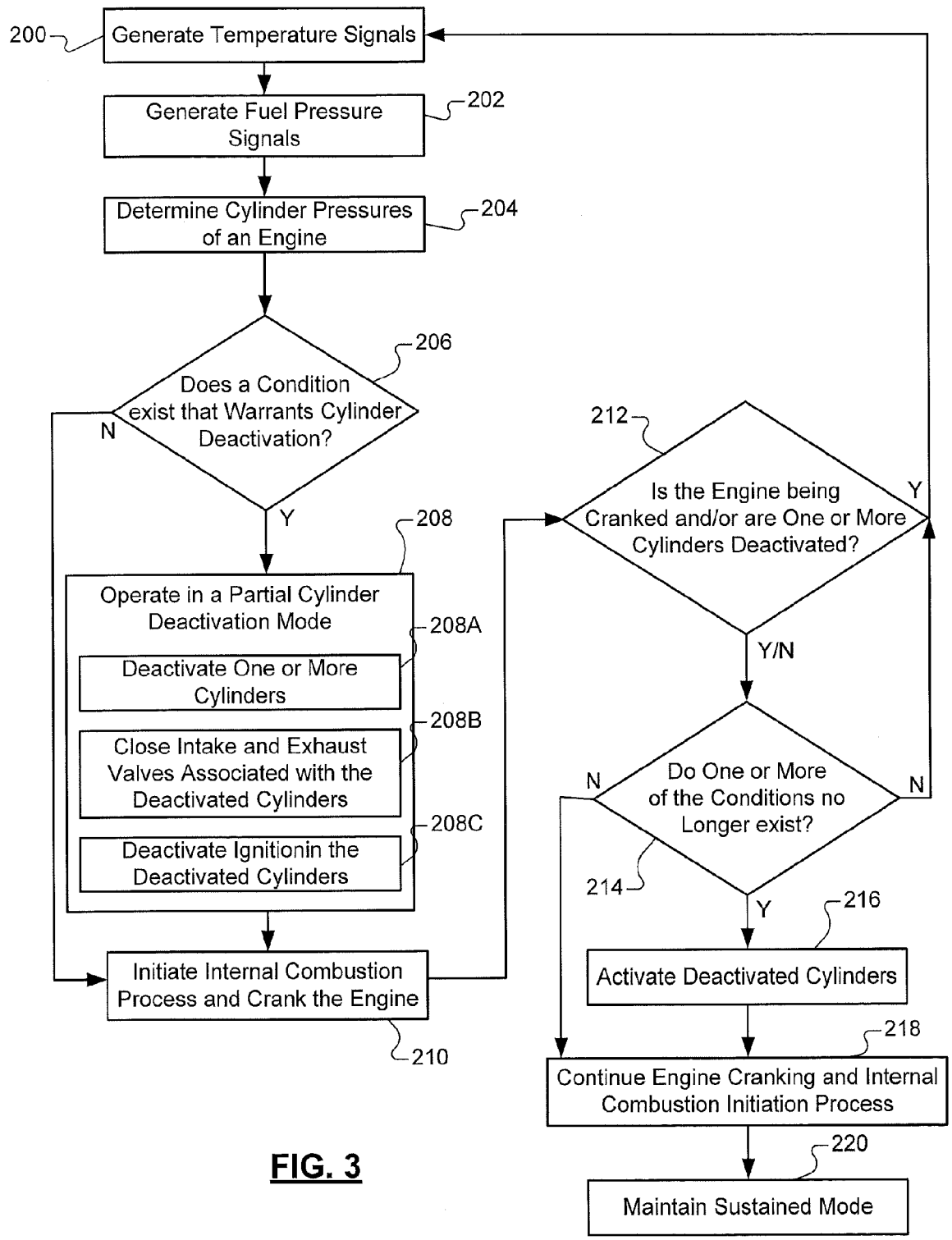
FIG. 3 is a logic flow diagram illustrating a method of starting an engine in accordance with an embodiment of the present disclosure.

Referring to FIG. 3, a logic flow diagram illustrating a method of starting an engine, such as one of the engines 10 and 10' is shown. Although the following steps are primarily described with respect to the embodiments of FIGS. 1 and 2, the steps may be easily modified to apply to other embodiments of the present invention.

In step 200, an engine system is operated in a start-up mode and one or more temperature signals are generated and received by a control module, such as one of the control modules 18 and 18'. Temperatures of the engine and/or of an engine coolant, engine oil, a transmission or other engine mounted element may be determined. Ambient temperature may also or alternatively be determined.

In step 202, fuel pressure to one or more fuel injectors, such as the fuel injectors 40 is determined.

In step 204, cylinder pressures are determined. In one embodiment, the cylinder pressures are indirectly determined based on known operating conditions and characteristics of the engine.

In steps 200-204, the temperatures and pressures may be directly or indirectly determined. When directly determined, the temperature and pressure signals may be received from sensors. When indirectly determined, the temperatures and pressures may be determined via a control module. Parameters of the engine, other than temperature and pressure, may also be determined. These parameters may also be directly and/or indirectly determined via the sensors or through use of other known techniques. An algorithm may be used to determine the temperatures, pressures and other parameters. As an example, tables may be stored in memory to determine the temperatures and/or pressures from other parameters, known operating conditions, and known operating characteristics of the engine and associated systems.

In step 206, the control module determines when one or more conditions exist, such as whether one or more of the temperatures is less than an associated predetermined threshold. When one or more conditions exist, the control module may proceed to steps 208, otherwise the control module may continue with a normal engine startup and combustion ignition process and proceed to step 210.

In step 208, the control module operates in a partial cylinder deactivation mode and deactivates one or more cylinders of the engine for one or more combustion cycles including intake and exhaust strokes. The number of cylinders deactivated is based on fuel pressure, high-pressure pump output, engine cranking speeds, injector size, one or more of the above-stated temperatures, and other parameters.

The cylinders are deactivated to increase pressure in a high-pressure fuel rail, such as the high-pressure fuel rail 62. When pressure in the high-pressure fuel rail is greater than cylinder pressure, fuel is able to be injected into the cylinders. Thus, cylinders may be deactivated until pressure in the high-pressure fuel rail is greater than cylinder pressure. When pressure in the high-pressure fuel rail is greater than the predetermined pressure, an efficient combustion may be initiated and sustained in the cylinders.

Fuel, spark, and intake and exhaust features of the deactivated cylinders and associated with the one or more combustion cycles are deactivated. The fuel, spark and intake and exhaust features may be deactivated simultaneously or based on appropriate timing schemes. This increases efficiency due to decreased demand in fuel and a quick increase in fuel pressure in the high-pressure fuel rail. The intake and exhaust valves are closed to reduce pumping work exhibited by the engine and to prevent production of a lean exhaust. Maintaining proper exhaust levels aid in maintaining catalytic converter light-off times.

Note that certain cylinders may be maintained in an active state during such deactivation and below-described cranking of the engine. The cylinders that are deactivated may be selected in any order, pattern, etc.

In step 208A, the control module deactivates one or more fuel injectors associated with one or more combustion chambers. In step 208B, the control module closes intake and exhaust valves associated with the one or more deactivated fuel injectors. The valves may be closed based on status of the fuel injectors and/or in response to a deactivation signal. Solenoids of the intake and exhaust valves may be actuated to close the intake and exhaust valves.

In step 208C, the control module deactivates ignition in one or more combustion chambers associated with the deactivated fuel injectors. The ignition may be deactivated based on status of the fuel injectors and/or in response to a deactivation signal.

In step 210, the control module initiates the internal combustion process and via a starter and a crankshaft cranks the engine. The engine is rotated, or in other words, the crankshaft is rotated through a plurality of chamber cycles.

In step 212, when the engine is being cranked and/or one or more of the cylinders remain deactivated the control module may return to step 200, otherwise step 214 may be performed. The control module may proceed to step 214 when all of the cylinders are activated or when the internal combustion process is in a sustained mode. The sustained mode refers to when the engine is able to continue the internal combustion process and cranking is no longer needed.

In step 214, when one or more of the conditions of step 206 no longer exists, the control module may proceed to step 216. As an example, when pressure within the high-pressure fuel rail is greater than current cylinder pressures and/or greater than a predetermined pressure the control module may proceed to step 216. As another example, when temperatures are greater than or equal to the threshold, the control module may proceed to step 216. In step 216, one or more of the deactivated cylinders are activated.

In step 218, activated cylinders are maintained in an active state and a normal cranking and internal combustion process is continued. Fuel, ignition, and air intake and exhaust features of the activated cylinders are operated in a normal mode. Air and fuel intake amounts or rates may be adjusted for startup, as opposed to when operating in the sustained mode. When the engine is in the sustained mode, step 220 is performed. Deactivated cylinders experience non-combustion or deactive chamber cycles. Pistons within the deactivated cylinders may be reciprocated, however, air, fuel and spark may not be provided to the associated combustion chambers. In step 220, the sustained mode is maintained.

The above-described steps are meant to be illustrative examples; the steps may be performed sequentially, synchronously, simultaneously, continuously, during overlapping time periods or in a different order depending upon the application.

The above described embodiments, allow an engine system to inject fuel at a high rail pressure during cold operating temperatures. The high rail pressure decreases emission output of an engine. The above described embodiments also allow for use of injectors that are reduced in size, since fuel requirements during a cold start affect injector sizing.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine cranking system comprising:
   a plurality of fuel injectors, associated with a plurality of combustion chambers of an engine, comprising:
   a first fuel injector associated with a first combustion chamber; and
   a second fuel injector associated with a second combustion chamber;
   a control module that operates said first fuel injector in a deactivated state for a first chamber cycle and during cranking of said engine, wherein said first chamber cycle includes intake and exhaust strokes and is associated with said first combustion chamber; and at least one of an intake valve and an exhaust valve of said first combustion chamber, wherein said control module maintains said at least one of said intake valve and said exhaust valve in a closed state during said intake and exhaust strokes.

2. The engine cranking system of claim 1 wherein said second fuel injector is an active state during a second chamber cycle, which occurs at least partially during said first chamber cycle.

3. The engine cranking system of claim 1 wherein said plurality of fuel injectors directly inject fuel into said plurality of combustion chambers.

4. The engine cranking system of claim 1 further comprising a fuel rail that supplies fuel to said plurality of fuel injectors.

5. The engine cranking system of claim 1 further comprising a pump that operates based on a rotation speed of said engine and supplies fuel to said plurality of injectors.

6. The engine cranking system of claim 5 wherein said engine comprises a crankshaft, and wherein said pump operates based on rotation speed of said crankshaft.

7. The engine cranking system of claim 5 wherein said engine comprises a camshaft, and wherein said pump operates based on rotation speed of said camshaft.

8. The engine cranking system of claim 1 further comprising a temperature sensor generating a temperature signal, wherein said control module operates said first fuel injector in said deactivated state and said second fuel injector in said activated state based on said temperature signal.

9. The engine cranking system of claim 8 wherein said temperature sensor detects at least one of an ambient temperature and a transmission temperature.

10. The engine cranking system of claim 1 further comprising:

a fuel rail supplying fuel to said plurality of fuel injectors; and a pressure sensor that is coupled to said fuel rail and that generates a pressure signal, wherein said control module operates said first fuel injector in said deactivated state and said second fuel injector in an activated state based on said pressure signal.

11. The engine cranking system of claim 1 further comprising a starter that cranks said engine, wherein said control module controls cranking speed of said engine during start up via said starter.

12. The engine cranking system of claim 1 wherein said engine comprises a valve train, wherein said control module selectively opens and closes valves in said valve train for a chamber cycle based on state of said plurality of fuel injectors for that chamber cycle.

13. The engine cranking system of claim 1 wherein said engine comprises a valve train, wherein said control module selectively opens and closes valves in said valve train during cranking of said engine.

14. The engine cranking system of claim 1 wherein said control module maintains said first fuel injector in a deactivated state during cranking of said engine.

15. The engine cranking system of claim 1 wherein said first chamber cycle includes a plurality of strokes of a piston within a combustion chamber.

16. The engine cranking system of claim 1 further comprising an ignition system igniting mixtures within said plurality of combustion chambers, wherein said control module deactivates a portion of said ignition system associated with said first combustion chamber during said first chamber cycle.

17. The engine cranking system of claim 1 wherein said first chamber cycle includes a compression stroke and an ignition stroke.

18. The engine cranking system of claim 1 wherein said control module deactivates said first fuel injector based on a fuel pressure, a pressure output of a fuel pump, and a fuel injector size.

19. An engine system comprising:

an engine that has a combustion chamber with a chamber cycle;

a fuel injector associated with said combustion chamber;

a temperature sensor generating a temperature signal; a control module that operates said fuel injector in a deactivated state for said chamber cycle, which includes intake and exhaust strokes, during cranking of said engine and based on said temperature signal; and at least one of an intake valve and an exhaust valve of said combustion chamber wherein said control module maintains said at least one of said intake valve and said exhaust valve in a closed state during said intake and exhaust strokes.

20. The engine system of claim 19 wherein said control module operates said fuel injector in a deactivated state during cranking of said engine when said temperature signal is less than a predetermined threshold.

21. A method of starting an engine comprising:

cranking an engine including rotating said engine through a plurality of chamber cycles;

deactivating a fuel injector associated with a combustion chamber of said engine during intake and exhaust strokes of at least one of said chamber cycles; and maintaining at least one of said intake valve and said exhaust valve of said combustion chamber in a closed state during said intake and exhaust strokes.

* * * * *